(12) United States Patent
Park (10) Patent No.: US 10,549,898 B2
(45) Date of Patent: Feb. 4, 2020

(54) TUMBLER HAVING ADDITIVE STORAGE SPACE

(71) Applicant: Moon Sik Park, Hwaseong-si (KR)

(72) Inventor: Moon Sik Park, Hwaseong-si (KR)

( * ) Notice: Subject to any disclaimer, the term of this patent is extended or adjusted under 35 U.S.C. 154(b) by 0 days.

(21) Appl. No.: 16/089,761

(22) PCT Filed: Mar. 30, 2017

(86) PCT No.: PCT/KR2017/003509
§ 371 (c)(1),
(2) Date: Jan. 30, 2019

(87) PCT Pub. No.: WO2017/171443
PCT Pub. Date: Oct. 5, 2017

(65) Prior Publication Data
US 2019/0152679 A1    May 23, 2019

(30) Foreign Application Priority Data

Apr. 1, 2016 (KR) .................. 10-2016-0040343

(51) Int. Cl.
*B65D 81/32* (2006.01)
*B65D 85/72* (2006.01)
(Continued)

(52) U.S. Cl.
CPC ............ *B65D 81/3211* (2013.01); *A23L 2/52* (2013.01); *A47G 19/2272* (2013.01);
(Continued)

(58) Field of Classification Search
CPC ............ B65D 81/3211; B65D 47/0895; B65D 21/02; B65D 47/20; B65D 47/00;
(Continued)

(56) References Cited

U.S. PATENT DOCUMENTS

| | | | | |
|---|---|---|---|---|
| 2,455,660 A | * | 12/1948 | Dunlop | ................. A47J 31/053 |
| | | | | 99/308 |
| 4,168,656 A | * | 9/1979 | Wolfer | .................... A47J 31/06 |
| | | | | 99/306 |

(Continued)

FOREIGN PATENT DOCUMENTS

| | | |
|---|---|---|
| JP | 2007-326579 | 1/2007 |
| KR | 20-0294064 | 11/2002 |

(Continued)

OTHER PUBLICATIONS

English Specification of 10-2009-0056153.
(Continued)

*Primary Examiner* — Jacob K Ackun
*Assistant Examiner* — Jenine Pagan
(74) *Attorney, Agent, or Firm* — Antonio Ha & U.S. Patent, LLC (57) ABSTRACT

The present invention relates to a tumbler for enabling an additive stored in a storage space to be added, in a fixed amount, to drinking water by a pumping means such that a user can drink the drinking water, and the present invention comprises: a drinking water tray of which an upper part is opened, and a lower end is shielded so as to form, on the inner side thereof, a storage space for storing drinking water or a beverage; an additive storage tray of which an upper part is opened, and a lower end is shielded so as to form a storage space in which an additive, to be drunk by being added to water, is stored.

11 Claims, 10 Drawing Sheets

(51) Int. Cl.
  *B65D 47/08* (2006.01)
  *A23L 2/52* (2006.01)
  *A47G 19/22* (2006.01)

(52) U.S. Cl.
  CPC ......... *B65D 47/0895* (2013.01); *B65D 85/72* (2013.01); *A23V 2002/00* (2013.01); *A47G 2400/04* (2013.01)

(58) Field of Classification Search
  CPC ........ B65D 83/00; B65D 43/02; B65D 81/32; B65D 1/22; B65D 85/72; A47G 19/2272; A47G 2400/04; A23L 2/52
  USPC .................. 206/220, 221, 222; 215/390, 391
  See application file for complete search history.

(56) References Cited

U.S. PATENT DOCUMENTS

| | | | | |
|---|---|---|---|---|
| 5,183,183 A | * | 2/1993 | Hernandez | A45F 3/16 206/221 |
| 5,309,823 A | * | 5/1994 | Allen | A47J 31/053 426/433 |
| 5,353,693 A | * | 10/1994 | Verhoven | A47J 31/053 99/281 |
| 6,517,878 B2 | * | 2/2003 | Heczko | A23L 2/00 206/219 |
| 6,622,615 B2 | * | 9/2003 | Heczko | A23L 2/00 426/113 |
| 7,367,709 B2 | * | 5/2008 | Ki | B05B 11/0081 366/130 |
| 7,552,673 B2 | * | 6/2009 | Levin | A61J 9/00 426/433 |
| 7,922,984 B2 | * | 4/2011 | Hamilton | A61L 2/20 134/6 |
| 2012/0211378 A1 | * | 8/2012 | Kalyanpur | B01F 15/0213 206/221 |
| 2014/0186507 A1 | * | 7/2014 | Wales | A47J 43/27 426/519 |

FOREIGN PATENT DOCUMENTS

| KR | 20-0419746 | 6/2006 |
|---|---|---|
| KR | 10-2009-0056153 | 6/2009 |
| KR | 10-2013-0000165 | 1/2013 |
| KR | 10-1430988 | 8/2014 |

OTHER PUBLICATIONS

English Specification of 2007-326579.
English Specification of 20-0419746.
English Specification of 10-1430988.
English Specification of 10-2013-0000165.
English Specification of 20-0294064.

* cited by examiner

TUMBLER HAVING ADDITIVE STORAGE SPACE

TECHNICAL FIELD

The present disclosure relates to a portable drinking container (tumbler) with an additive storage space, and more particularly, to a tumbler which can add an additive stored in a storage space by a certain amount to drinking water through a pumping unit such that a user can drink the beverage.

BACKGROUND ART

Recently, more and more people carry and drink beverage. Such a trend has increased the concern about the environment, while giving rise to the controversy over toxic properties of disposable cups. Therefore, the number of people who carry and drink beverage using personal tumblers is increasing.

The conventional tumbler generally includes a cylindrical container body and a lid for opening/closing the top of the container body. A user may store beverage in the container body, and open the lid to drink the beverage stored in the container body.

The conventional tumbler is suitable for storing completed beverage to drink, but has a limitation in storing beverage which is made by adding an additive to drinking water.

In other words, in the case of most beverages which are made by adding additives, a relatively small amount of additive is diluted in a large amount of water in order to make each of the beverages. However, since the conventional tumbler stores diluted beverage, the tumbler has a limit to the storage capacity.

Therefore, there is a demand for a tumbler which can store an additive in a drinking container, and enable a user to repeatedly make beverage while supplying readily available water to the container.

Figure 1:
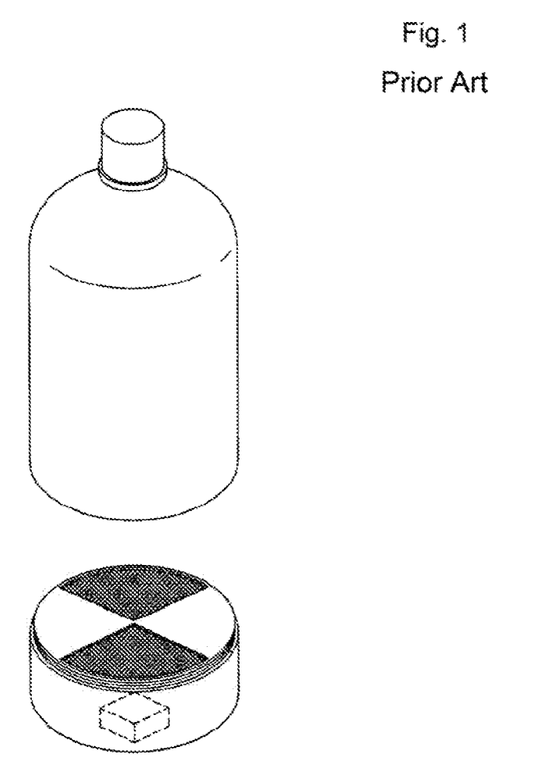
FIG. 1 is an exploded perspective view illustrating a conventional tumbler with a storage space for a solid additive.

According to such a demand, Korean Patent Publication No. 10-2009-0056153 has disclosed a tumbler which has a space capable of storing an addition in the bottom thereof, as illustrated in FIG. 1.

However, the conventional tumbler has the following problems.

Recently, the use of additives as health food which are diluted with water to drink has widely spread, the additives including red ginseng, honey, aronia liquid (or concentrate), vinegar, Dutch coffee and the like. However, the conventional tumbler cannot be applied to liquid additives.

Furthermore, since the conventional tumbler simply provides only a storage space for an additive, a user needs to take the additive out of the storage space and add the additive in person. In particular, when the additive is a liquid additive, the liquid additive may make it unpleasant for the user to make beverage. In addition, the liquid additive may cause various problems such as a leakage of the additive, waste of the additive and a sanitation problem.

DISCLOSURE

Technical Problem

Various embodiments are directed to a tumbler with an additive storage space, which has a storage space for storing an additive provided as a liquid additive (crude liquid or concentrate) such as red ginseng, honey, aronia liquid (or concentrate), vinegar or Dutch coffee.

Also, various embodiments are directed to a tumbler with an additive storage space, which can add a certain amount of liquid additive therein without taking the liquid additive to the outside, such that a user can repeatedly make and drink a large amount of beverage by supplying only water, without separating the additive storage space.

Technical Solution

In an embodiment, a tumbler with an additive storage space may include: a drinking water tray having an open top and closed bottom to form a storage space for storing drinking water or beverage therein; an additive storage tray having an open top and closed bottom to form a storage space for storing an additive which is added to water and drunk by a user, wherein the open top is coupled to the bottom of the drinking water tray; an upper lid covering the open top of the drinking water tray, and including a plug for selectively opening/closing a drinking port through which a user drinks the stored drinking water or beverage; and a pumping unit fixed to one side of the upper lid, and configured to move the additive stored in the additive storage tray to the drinking water tray by pumping the additive.

The outer surfaces of the upper lid, the drinking water tray and the additive storage tray may be formed in a circular or polygonal shape.

The drinking water tray may include a suction pipe installed through the closed bottom surface thereof, having one side extended into the drinking water tray and connected to the pumping unit and the other side extended to the outside, and disposed in the additive storage tray when coupled to the additive storage tray.

At this time, the suction pipe may be connected to the pumping unit through the suction valve, and the suction valve may include a one-way valve configured to form only a flow path toward the inside from the outside of the pumping unit.

The pumping unit may include: a button protruded upward from the upper lid through a coupling hole formed at the top of the upper lid; a piston rod moved upward/downward by upward/downward movement of the button; a housing of which the inside is pressurized by the upward/downward movement of the piston rod; an elastic member providing a returning force to the button and the piston rod; and an opening/closing unit installed between the bottom of the housing and the suction pipe, and configured to selectively open/close the suction pipe according to the upward/downward movement of the piston rod.

At this time, the pumping unit may further include a discharge pipe extended into the drinking water tray from the top of the button, and discharging the additive moved through the inside of the piston rod to the drinking water tray.

The pumping unit may include: a button protruded upward from the upper lid through a coupling hole formed at the top of the upper lid; a piston rod moved upward/downward by upward/downward movement of the button; a piston ring installed at the bottom of the piston rod; a housing pressed against the piston ring such that the inside thereof is pressurized by the upward/downward movement of the piston rod; an elastic member providing a returning force to the button and the piston rod; and an opening/closing unit installed between the bottom of the housing and the suction pipe, and configured to selectively open/close the suction pipe according to the upward/downward movement of the piston rod.

The housing may include a discharge pipe extended into the drinking water tray from the housing to discharge the additive stored in the housing to the drinking water tray.

The opening/closing unit may include: a moving ball valve including a round ball formed of a metal; and a coupling member including the moving ball valve installed therein and having one end coupled to the bottom of the housing and the other end coupled to the top of the suction pipe.

The pumping unit may further include a blocking member installed at the top of the piston ring so as to be fixed to the top of the housing, and configured to prevent the piston ring from separating from the housing while suppressing a leakage of the additive stored in the housing.

The piston rod may have a rod movement space in which a flow path extended to the discharge pipe is selectively opened/closed according to the upward/downward movement of the piston rod.

The discharge valve may include a one-way valve configured to form only a flow path toward the outside from the inside of the housing.

In another embodiment, a tumbler with an additive storage space may include: a drinking water tray having an open top and closed bottom to form a storage space for storing drinking water or beverage therein; an additive storage tray having an open top and closed bottom to form a storage space for storing an additive which is added to water and drunk by a user, wherein the open top is coupled to the bottom of the drinking water tray; an upper lid covering the open top of the drinking water tray, and including a plug for selectively opening/closing a drinking port through which a user drinks the stored drinking water or beverage; and a pumping unit fixed to one side of the upper lid, and configured to move the additive stored in the additive storage tray to the drinking water tray by pumping the additive.

The outer surfaces of the upper lid, the drinking water tray and the additive storage tray may be formed in a circular shape.

The outer surfaces of the upper lid, the drinking water tray and the additive storage tray may be formed in a polygonal shape.

The pumping unit may include: a button protruded upward from the upper lid through a coupling hole formed at the top of the upper lid; a piston moved upward/downward by upward/downward movement of the button; a cylinder having the piston inserted therein such that the inside thereof is pressurized by the upward/downward movement of the piston; an elastic member providing a returning force to the button and the piston; a suction pipe connecting the cylinder and the additive storage tray through a through-hole formed at the bottom surface of the drinking water tray, and moving the additive stored in the additive storage tray into the cylinder; and a discharge pipe extended into the drinking water tray from the cylinder to discharge the additive stored in the cylinder to the drinking water tray.

The suction pipe may be connected to the cylinder through the suction valve, and the suction valve may include a one-way valve configured to form only a flow path toward the inside from the outside of the cylinder.

The discharge pipe may be connected to the cylinder through the discharge valve, and the discharge valve may include a one-way valve configured to form only a flow path toward the outside from the inside of the cylinder.

The pumping unit may include a support ring fixed to the suction pipe at the bottom of the through-hole, guaranteeing the minimum length of the suction pipe introduced into the additive storage tray, and preventing the additive from moving between the through-hole and the outside of the suction pipe.

The support ring may include an elastic band.

The support ring may include a nut formed of a non-metallic material.

The drinking water tray may further include a guide pipe formed in the shape of a hollow pipe, extended to the inner top of the drinking water tray from the through-hole such that the suction pipe is inserted into the guide pipe, and configured to divide the internal space of the additive storage tray and the internal space of the additive storage tray.

Advantageous Effects

The above-described tumbler with an additive storage space according to the present invention may have the following effects.

The tumbler can store a liquid additive, add a certain amount of additive therein without taking the stored additive to the outside, and enable a user to easily make beverage using the additive.

Therefore, the user can repeatedly make and drink a large amount of beverage by supplying only readily available drinking water.

Furthermore, since the liquid additive does not need to be separated from the storage space in order to make beverage, a leakage of the liquid additive will leak can be prevented. Therefore, the loss of the additive can be prevented, and the sanitation can be guaranteed.

BEST MODE FOR INVENTION

A tumbler with an additive storage space may include: a drinking water tray having an open top and closed bottom to form a storage space for storing drinking water or beverage therein; an additive storage tray having an open top and closed bottom to form a storage space for storing an additive which is added to water and drunk by a user, wherein the open top is coupled to the bottom of the drinking water tray; an upper lid covering the open top of the drinking water tray, and including a plug for selectively opening/closing a drinking port through which a user drinks the stored drinking water or beverage; and a pumping unit fixed to one side of the upper lid, and configured to move the additive stored in the additive storage tray to the drinking water tray by pumping the additive.

At this time, the pumping unit may include: a button protruded upward from the upper lid through a coupling hole formed at the top of the upper lid; a piston moved upward/downward by upward/downward movement of the button; a cylinder having the piston inserted therein such that the inside thereof is pressurized by the upward/downward movement of the piston; an elastic member providing a returning force to the button and the piston; a suction pipe connecting the cylinder and the additive storage tray through a through-hole formed at the bottom surface of the drinking water tray, and moving the additive stored in the additive storage tray into the cylinder; and a discharge pipe extended into the drinking water tray from the cylinder to discharge the additive stored in the cylinder to the drinking water tray.

MODE FOR INVENTION

Hereafter, various embodiments of a tumbler with an additive storage space according to the present invention will be described with reference to the accompanying drawings.

First, referring to FIGS. 2 to 4, a tumbler with an additive storage space according to a specific embodiment of the present invention will be described in detail.

Figure 2:
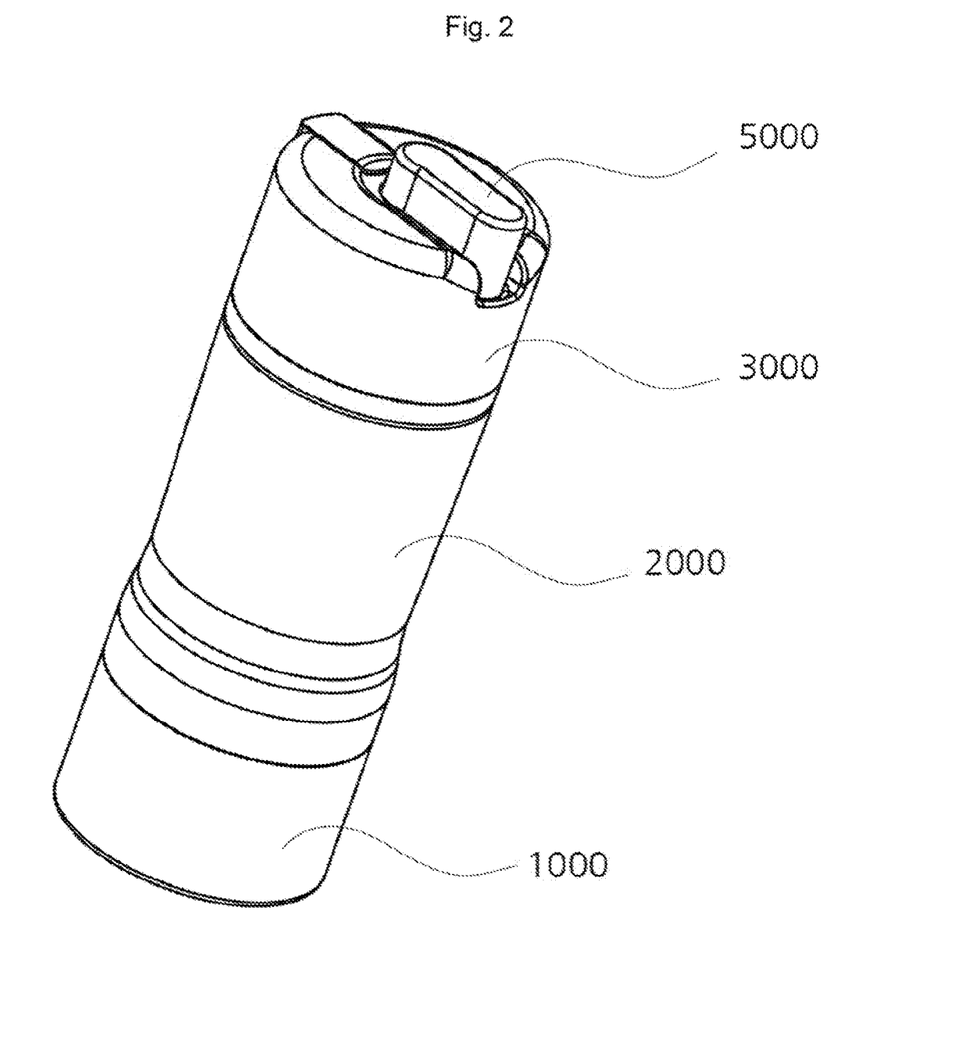
FIG. 2 is a perspective view of the tumbler with an additive storage space according to the specific embodiment of the present invention.
Figure 3:
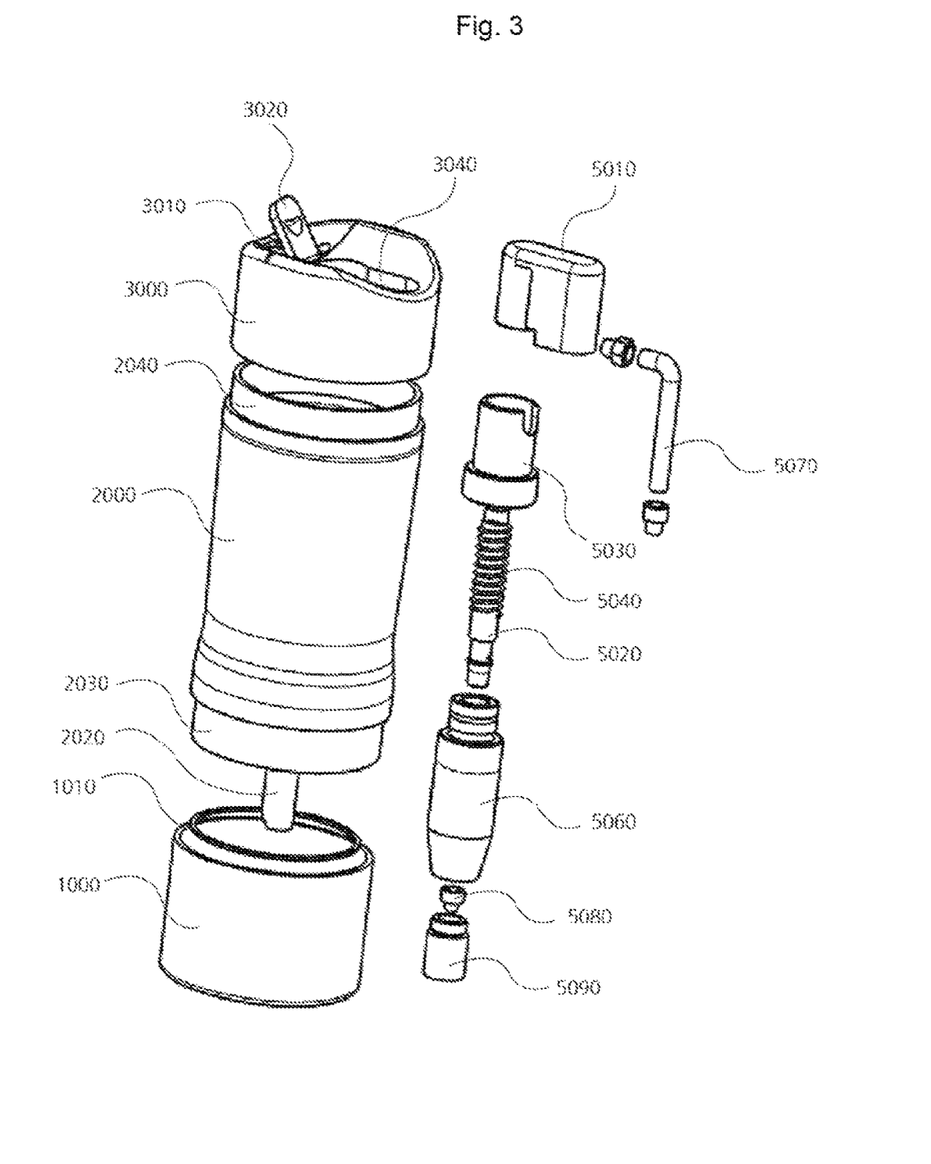
FIG. 3 is an exploded perspective view of the tumbler with an additive storage space according to the specific embodiment of the present invention.
Figure 4:
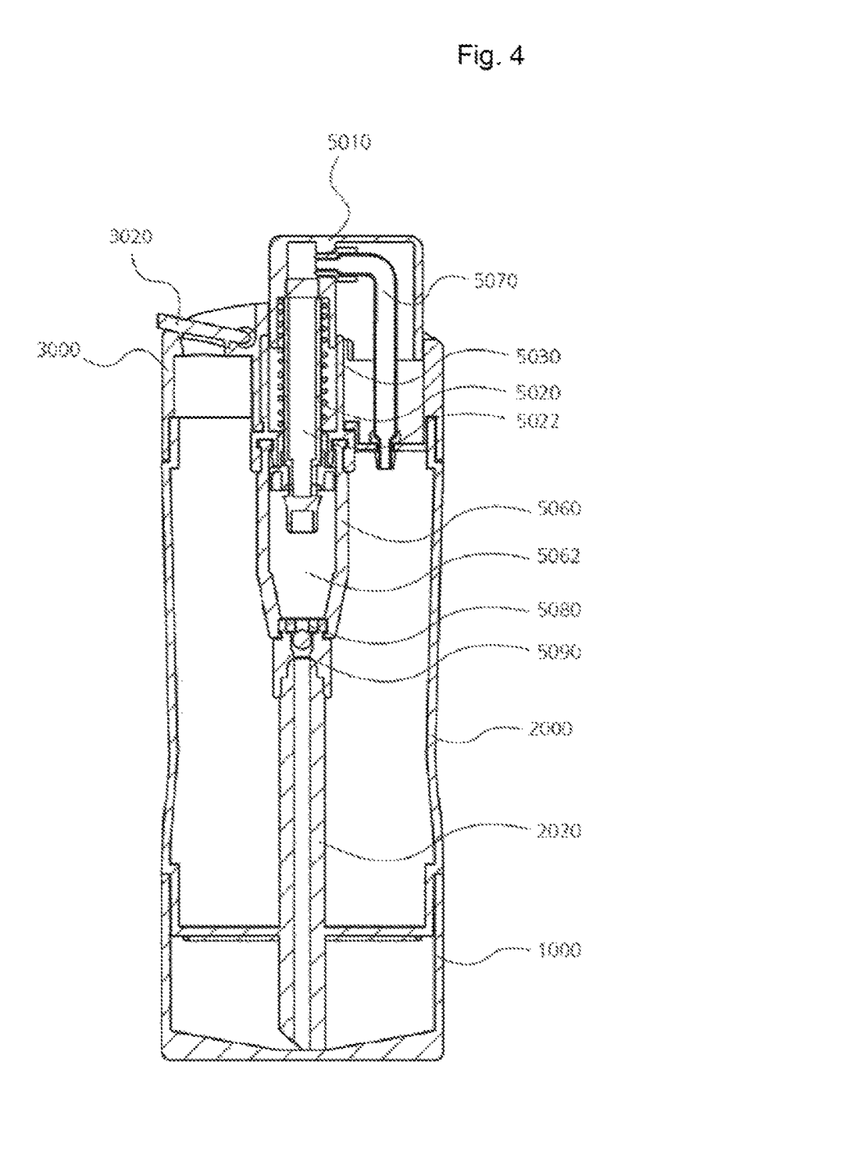
FIG. 4 is an assembled cross-sectional view of the tumbler with an additive storage space according to the specific embodiment of the present invention.

FIG. 2 is a perspective view of the tumbler with an additive storage space according to the specific embodiment of the present invention, FIG. 3 is an exploded perspective view of the tumbler with an additive storage space according to the specific embodiment of the present invention, and FIG. 4 is an assembled cross-sectional view of the tumbler with an additive storage space according to the specific embodiment of the present invention.

First, as illustrated in FIG. 2, the tumbler with an additive storage space according to the embodiment of the present invention includes an additive storage tray 1000, a drinking water tray 2000, an upper lid 3000 and a pumping unit 5000.

The top of the additive storage tray 1000 is coupled to the bottom of the drinking water tray 2000, and the additive storage tray 100 serves to store an additive therein. The additive storage tray 1000 may include a tray O-ring 1010 to prevent a liquid additive from leaking to the outside along the coupling. This structure will be described in detail below.

The drinking water tray 2000 serves to store the drinking water, and constitutes the body of the tumbler, through which beverage is made by adding the additive to the drinking water and provided to a user.

As illustrated in FIG. 3, the drinking water tray 2000 includes a fastening part 2030 formed at the bottom thereof and a coupling part 2040 formed at the top thereof. The drinking water tray 2000 is coupled to the additive storage tray 1000 through the fastening part 2030, and coupled to the upper lid 3000 through the coupling part 2040.

At this time, the fastening part 2030 and the coupling part 2040 may have a stepped structure so as to be forced into the additive storage tray 1000 and the upper lid 3000, respectively, or have a screw thread formed thereon for screw coupling.

The fastening part 2030 and the coupling part 2040 may include the tray O-ring 1010 and a cover O-ring 3030 to prevent liquid contents from leaking to the outside.

The bottom surface of the drinking water tray 2000 is closed, and a suction pipe 2020 is installed in the center of the bottom surface as illustrated in FIGS. 3 and 4, in order to take the additive out of the additive storage tray 1000.

At this time, the suction pipe 2020 may be integrated with the bottom surface of the drinking water tray 2000.

The upper lid 3000 covers the top of the drinking water tray 2000, is selectively opened/closed by a user who wants to drink the beverage stored in the drinking water tray 2000, and serves to fix the pumping unit 5000 which will be described below. For this function, the upper lid 300 includes a drinking port 3010 and a plug 3020 for selectively opening/closing the drinking port 3010.

The drinking port 3010, through which a user can drink the stored beverage, may be protruded upward or formed as a through-hole at the top surface of the upper lid 3000.

The plug 3020 serves to selectively close the drinking port 3010. As illustrated in FIG. 3, the plug 3020 may be rotatably installed at the top of the upper lid 3000, or installed as a separate component and connected to the upper lid 3000 through a wire.

The pumping unit 5000 serves to put the additive stored in the additive storage tray 1000 into the drinking water tray 2000 by moving the additive by a fixed amount through pumping. For this operation, the pumping unit 5000 includes a button 5010, a piston rod 5020, a coupling cover 5030, an elastic member 5040, a housing 5060, a discharge pipe 5070, a moving ball valve 5080 and a coupling member 5090.

The button 5010 is protruded upward from the upper lid 3000 through a coupling hole 3040, and serves to transfer a pressing force while moved upward/downward by a user. The piston rod 5020 serves to pressurize the inside of the housing 5060 while moved upward/downward by the button 5010. The elastic member 5040 serves to provide an upward returning force to the button 5010.

The coupling cover 5030 is installed outside the piston rod 5020, and serves to couple the piston rod 5020 to the button 5010.

At this time, the top of the piston rod 5020 is coupled to the inner top of the button 5010. As illustrated in FIG. 4, the discharge pipe 5070 is installed at the inner top of the button 5010, and extended toward the inside the drinking water tray 2000.

The housing 5060 serves to not only move the additive of the additive storage tray 1000 upward/downward, using a pressure difference which is generated while the piston rod 5020 is moved, but also move the additive within the housing 5060 into the drinking water tray 2000 through the discharge pipe 5070.

The discharge pipe 5070 is extended into the drinking water tray 2000 from the top of the button 5010, such that the additive moved upward by the pumping unit 5000 is put into the drinking water tray 2000 through the discharge pipe 5070.

The suction and discharge process of the additive will be described in detail below.

The moving ball valve 5080 serves as a one-way damper to selectively close the top of the suction pipe 2020. The moving ball valve 5080 is moved upward to open the suction pipe 2020 when a suction force is generated in the housing 5060, and moved downward to close the top of the suction pipe 2020 when a compression force is generated in the housing 5060.

For this operation, the moving ball valve 5080 includes a round ball formed of a metal, ceramic or synthetic resin and an insert tube for supporting the top of the ball.

The coupling member 5090 includes the moving ball valve 5080 therein, the top of the coupling member 5090 is coupled to the bottom of the housing 5060, and the bottom of the coupling member 5090 is coupled to the top of the suction pipe 2020.

Hereafter, the suction and discharge process of an additive in the tumbler with an additive storage space according to the specific embodiment of the present invention will be described in detail.

When the button 5010 is pressed down with an additive stored in the additive storage tray 1000 of the tumbler and the drinking water tray 2000 filled with drinking water, the piston rod 5020 is moved downward.

Therefore, while the internal pressure of the housing 5060 is increased, the moving ball valve closes the top of the suction pipe 2020.

Then, the additive stored in a housing storage space 5062 is introduced into a rod movement space 5022 through an inlet formed at an end of the piston rod 5020 by the internal pressure of the housing 5060.

Then, the additive of the rod movement space 5022 is moved to the discharge pipe 5070, and put into the drinking water tray 2000 through the discharge pipe 5070.

When the pressure applied to the button 5010 is removed, the piston rod 5020 is moved upward by an elastic force of the elastic member 5040, and the internal pressure of the housing 5060 is changed to low pressure.

Thus, while the moving ball valve 5080 is moved upward, the suction pipe 2020 is opened, and the additive of the additive storage tray 1000 is introduced into the housing 5060 along the suction pipe 2020.

Therefore, while repeating the operation of pressing the button 5010, a user can put the additive stored in the additive storage tray 1000 by a fixed amount into the drinking water tray 2000.

The tumbler with an additive storage space according to the specific embodiment of the present invention includes the discharge pipe 5070 installed at the top of the button 5010. Thus, the tumbler can prevent the additive from being mixed with the drinking water within the drinking water tray 2000 through the discharge pipe 5070, even though the tumbler is vibrated, shaken or tilted.

Next, referring to FIGS. 5 and 6, a tumbler with an additive storage space according to another embodiment of the present invention will be described in detail.

Figure 5:
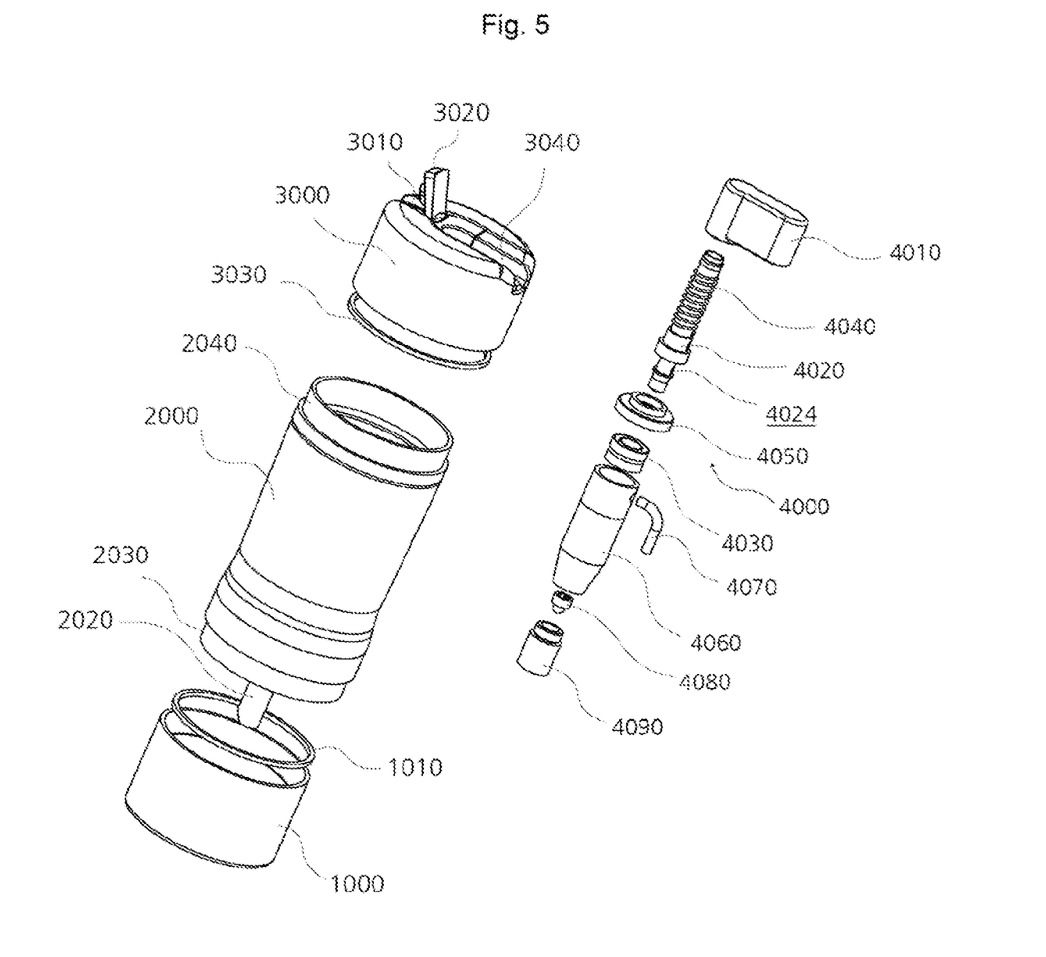
FIG. 5 is an exploded perspective view of a tumbler with an additive storage space according to another embodiment of the present invention.
Figure 6:
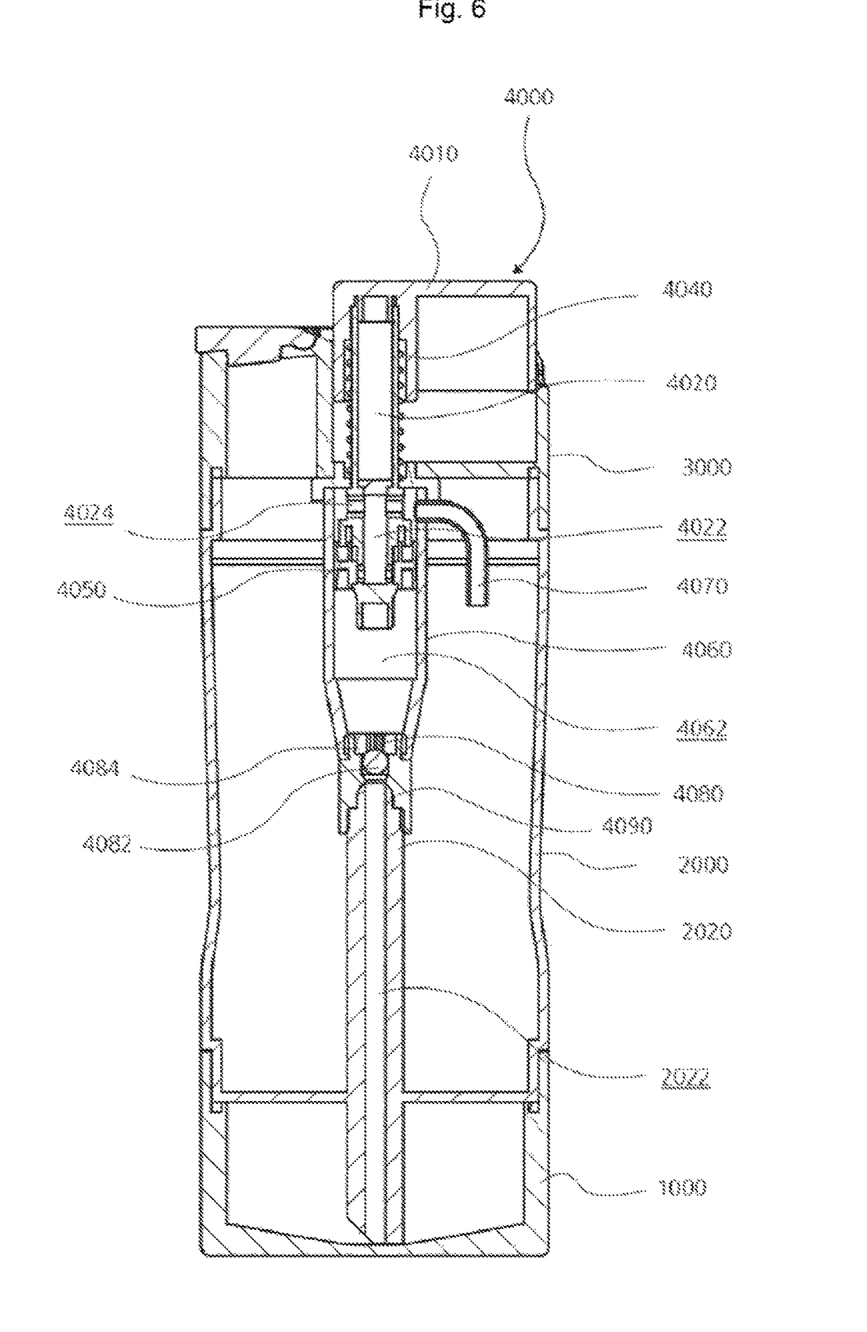
FIG. 6 is an assembled cross-sectional view of the tumbler with an additive storage space according to the embodiment of the present invention.

FIG. 5 is an exploded perspective view of a tumbler with an additive storage space according to another embodiment of the present invention, and FIG. 6 is an assembled cross-sectional view of the tumbler with an additive storage space according to the embodiment of the present invention.

The tumbler with an additive storage space according to the embodiment of the present invention includes an additive storage tray 1000, a drinking water tray 2000 and an upper lid 3000, which have the same structures as those of the tumbler with an additive storage space according to the specific embodiment of the present invention. However, the tumbler with an additive storage space according to the embodiment of the present invention includes a pumping unit 4000 having a different structure from that of the tumbler with an additive storage space according to the specific embodiment of the present invention.

The pumping unit 4000 of the tumbler with an additive storage space according to the embodiment of the present invention serves to put an additive stored in the additive storage tray 1000 into the drinking water tray 2000 by moving the additive by a fixed amount through pumping. For this operation, the pumping unit 4000 includes a button 4010, a piston rod 4020, a piston ring 4030, an elastic member 4040, a blocking member 4050, a housing 4060, a discharge pipe 4070, a moving ball valve 4080 and a coupling member 4090.

The button 4010 is protruded upward from the upper lid 3000 through a coupling hole 3040, and serves to transfer a pressing force while moved upward/downward by a user. The piston rod 4020 serves to pressurize the inside of the housing 4060 while moved upward/downward by the button 4010. The elastic member 4040 serves to provide an upward returning force to the button 4010.

The piston ring 4030 is fastened to the bottom of the piston rod 4020, and moved upward/downward with the piston rod 4020 while pressed against the inside of the housing 4060.

That is, when the button 4010 is moved downward by the user, the piston ring 4030 is moved downward according to the downward movement of the piston rod 4020, thereby increasing the internal pressure of the housing 4060. Then, the piston ring 4030, the piston rod 4020 and the button 4010 are returned upward by the elastic force of the elastic member 4040.

The blocking member 4050 serves to limit the movement of the piston rod 4020 by limiting the movement of the piston ring 4030.

As described above, the housing 4060 serves to not only move the additive of the additive storage tray 1000 upward/downward, using a pressure difference which is generated while the piston ring 4030 is moved, but also move the additive within the housing 4060 into the drinking water tray 2000 through the discharge pipe 4070

The discharge pipe 4070 is extended from one side of the housing 4060 to the inside of the drinking water tray 2000, such that the additive moved upward by the pumping unit 4000 is put into the drinking water tray 2000 through the discharge pipe 4070.

The suction and discharge process of the additive will be described in detail again.

The moving ball valve 4080 serves as a one-way damper which selectively closes the top of the suction pipe 2020. The moving ball valve 4080 is moved upward to open the suction pipe 2020 when a suction force is generated in the housing 4060, and moved downward to close the top of the suction pipe 2020 when a compression force is generated in the housing 4060.

For this operation, the moving ball valve 4080 includes a round ball 4082 formed of a metal and an insert tube 4084 to support the top of the ball 4082.

The coupling member 4090 includes the moving ball valve 4080 therein, the top of the coupling member 4090 is coupled to the bottom of the housing 5060, and the bottom of the coupling member 5090 is coupled to the top of the suction pipe 2020.

Hereafter, the suction and discharge process of the additive in the tumbler with an additive storage space according to the embodiment of the present invention will be described in detail.

When the button 4010 is pressed down with the additive stored in the additive storage tray 1000 of the tumbler and the drinking water tray 2000 filled with drinking water, the piston rod 4020 and the piston ring 4030 are moved downward.

Therefore, while the internal pressure of the housing 4060 is increased, the moving ball valve 4080 closes the top of the suction pipe 2020.

Then, the additive stored in a housing storage space 4062 is introduced into a rod movement space 4022 through an inlet formed at an end of the piston rod 4020 by the internal pressure of the housing 4060.

Then, the additive of the rod movement space 4022 is moved to the discharge pipe 4070 through a rod discharge hole 4024, and put into the drinking water tray 2000 through the discharge pipe 5070.

When the pressure applied to the button 4010 is removed, the piston rod 4020 is moved upward by an elastic force of the elastic member 4040, and the internal pressure of the housing 4060 is changed to low pressure.

Thus, while the moving ball valve 4080 is moved upward, the suction pipe 2020 is opened, and the additive of the additive storage tray 1000 is introduced into the housing 4060 along the suction pipe 2020.

Therefore, while repeating the operation of pressing the button 4010, a user may put the additive stored in the additive storage tray 1000 by a fixed amount into the drinking water tray 2000.

Then, referring to FIGS. 7 and 8, a tumbler with an additive storage space according to still another embodiment of the present invention will be described in detail.

Figure 7:
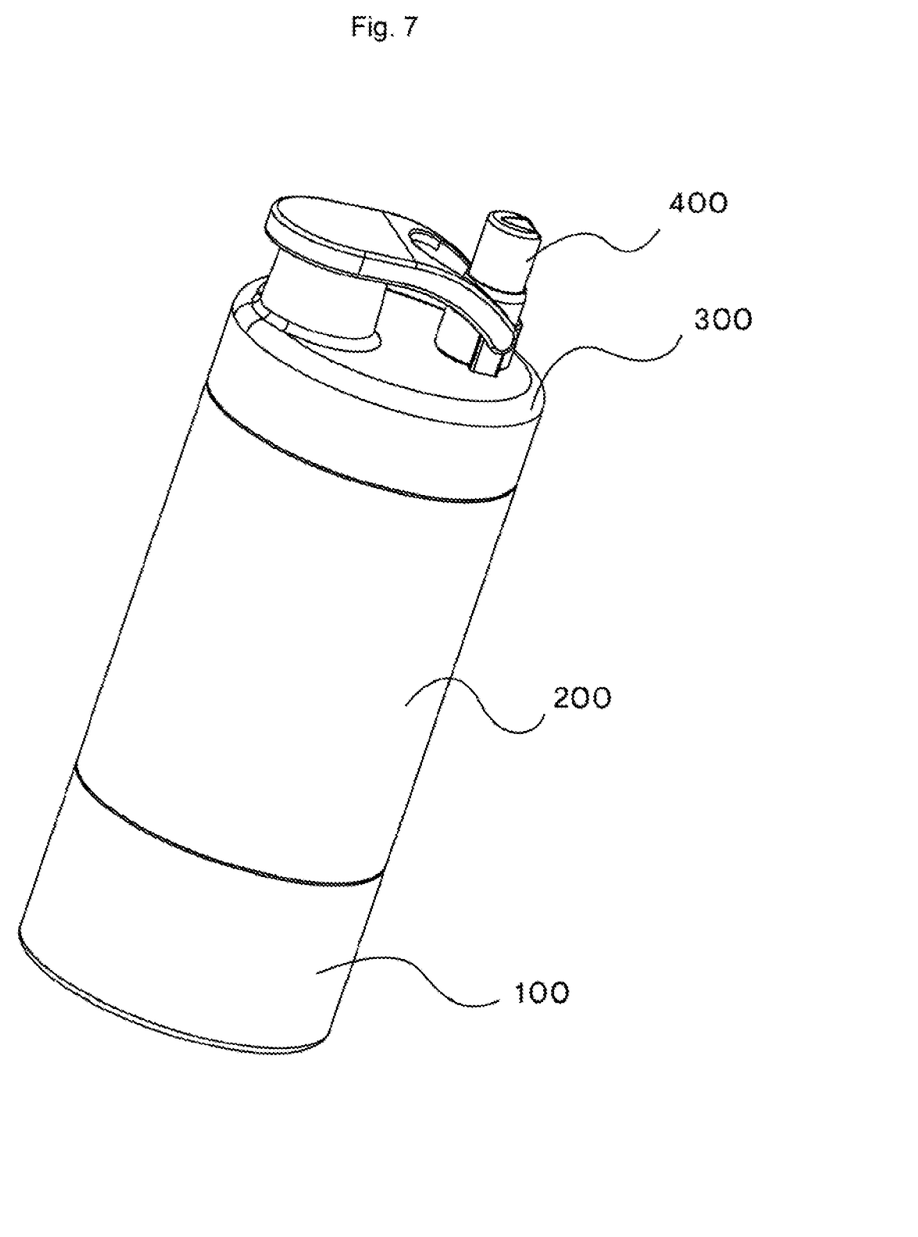
FIG. 7 is a perspective view of a tumbler with an additive storage space according to still another embodiment of the present invention.
Figure 8:
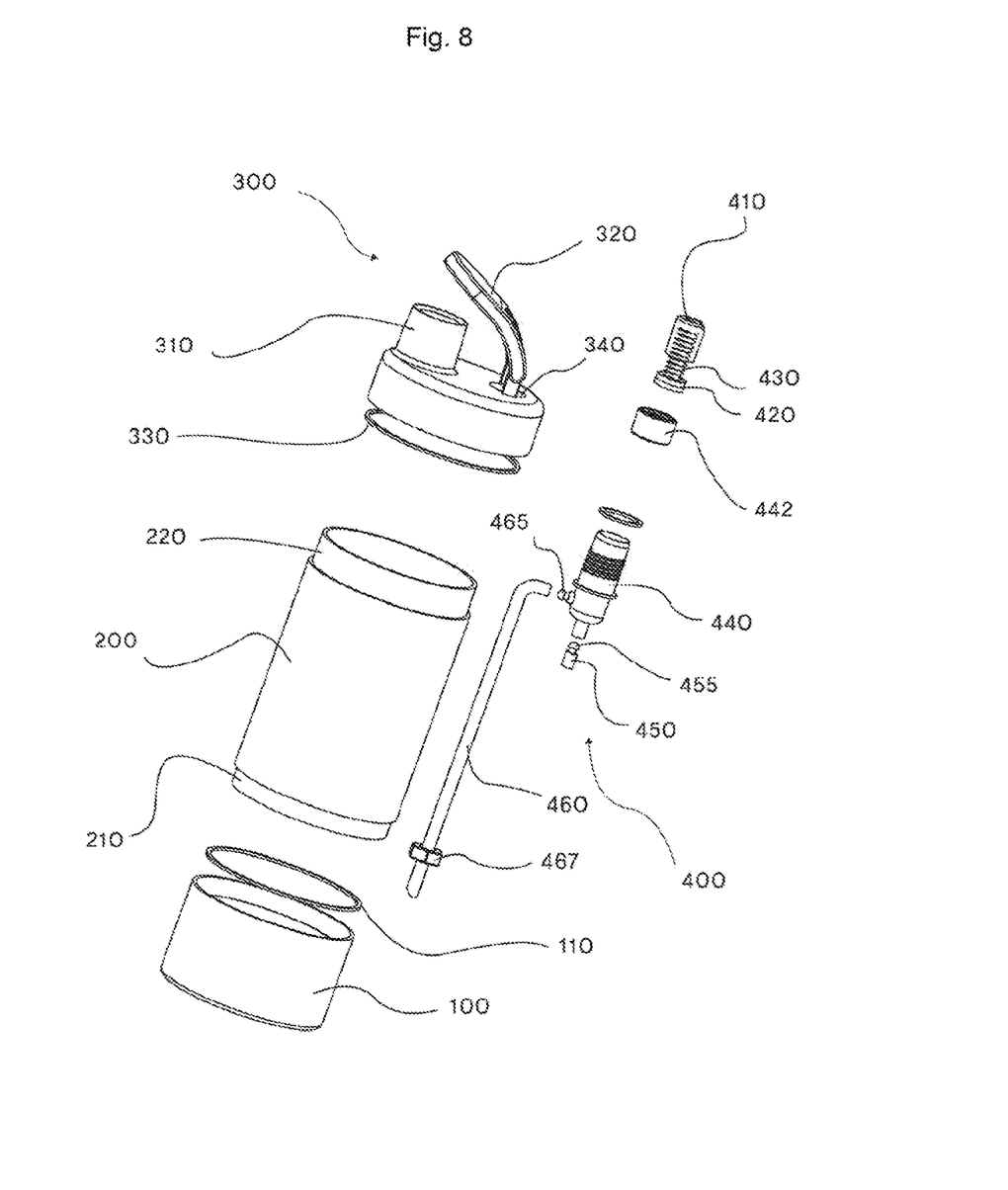
FIG. 8 is an exploded perspective view of the tumbler with an additive storage space according to the embodiment of the present invention.
Figure 9:
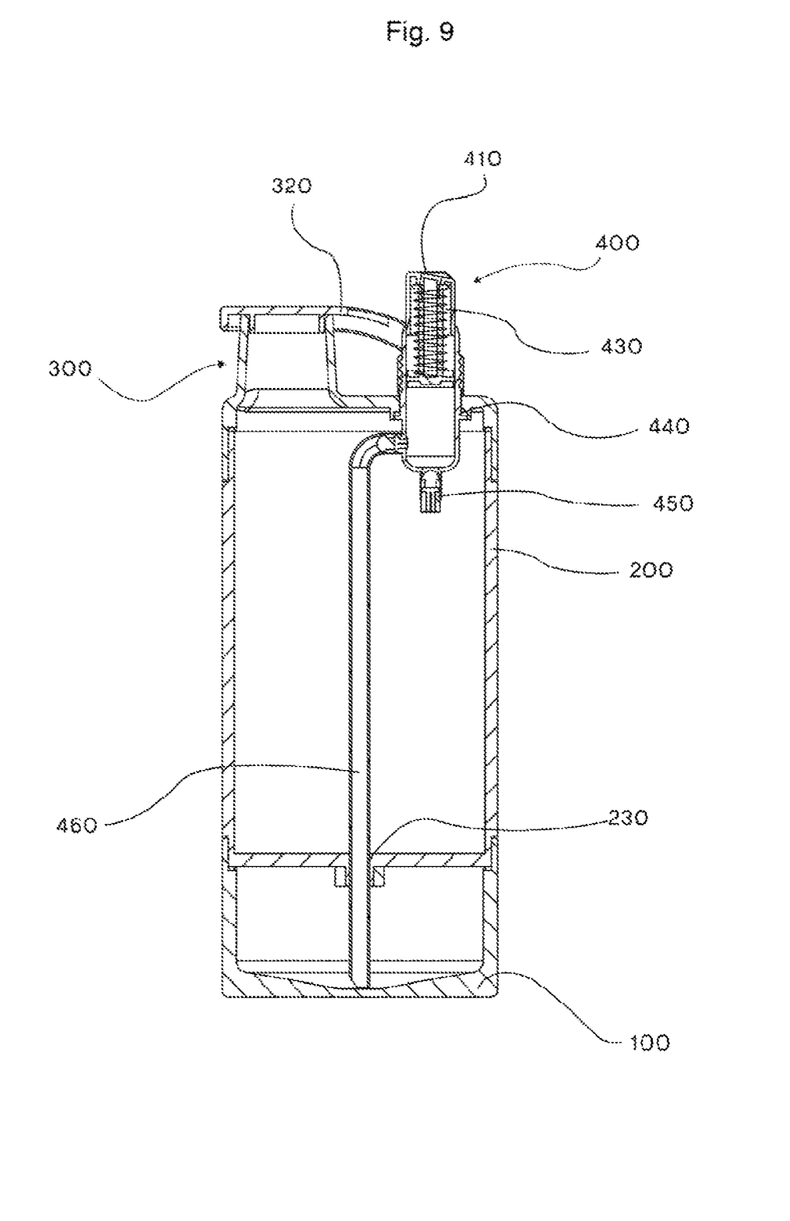
FIG. 9 is an assembled cross-sectional view of the tumbler with an additive storage space according to the embodiment of the present invention.

FIG. 7 is a perspective view of a tumbler with an additive storage space according to still another embodiment of the present invention, FIG. 8 is an exploded perspective view of the tumbler with an additive storage space according to the embodiment of the present invention, and FIG. 9 is an assembled cross-sectional view of the tumbler with an additive storage space according to the embodiment of the present invention.

As illustrated in FIG. 7, the tumbler with an additive storage space according to the embodiment of the present invention includes an additive storage tray 100, a drinking water tray 200, an upper lid 300 and a pumping unit 400.

The top of the additive storage tray 100 is coupled to the bottom of the drinking water tray 200, and the additive storage tray 100 serves to store an additive therein. The additive storage tray 100 may include a first O-ring 110 to prevent a liquid additive from leaking to the outside along the coupling part 220. This structure will be described in detail below.

The drinking water tray 200 serves to store the drinking water, and constitutes the body of the tumbler, through which beverage is made by adding the additive to the drinking water and provided to a user.

As illustrated in FIG. 8, the drinking water tray 200 includes a fastening part 210 formed at the bottom thereof and the coupling part 220 formed at the top thereof. The drinking water tray 200 is coupled to the additive storage tray 100 through the fastening part 210, and coupled to the upper lid 300 through the coupling part 220.

At this time, the fastening part 210 and the coupling part 220 may have a stepped structure so as to be forced into the additive storage tray 100 and the upper lid 300, respectively, or have screw threads formed thereon for screw coupling. As illustrated in FIG. 8, the fastening part 210 and the coupling part 220 may have first and second O-rings 210 and 230 to prevent liquid contents from leaking to the outside.

As illustrated in FIG. 9, a through-hole 230 is formed in the center of the bottom surface of the drinking water tray 200, such that a suction pipe 460 for taking the additive out of the additive storage tray 100 can pass through the through-hole 230.

The upper lid 300 covers the top of the drinking water tray 200, is selectively opened/closed by a user who wants to drink beverage stored in the tumbler, and serves to fix the pumping unit 400 which will be described below. For this operation, the upper lid 300 includes a drinking port 310 and a plug 320 for selectively closing the drinking port 310.

Through the drinking port 310, the user can drink the stored beverage. As illustrated in FIG. 8, the drinking port 310 may be protruded upward, and formed as a through-hole at the top surface of the upper lid 300.

The plug 320 serves to selectively close the drinking port 310. As illustrated in FIG. 8, the plug 320 may be rotatably installed at the top of the upper lid 300, or formed as a separate component and connected to the upper lid 300 through a wire or the like.

The pumping unit 400 serves to put the additive stored in the additive storage tray 100 into the drinking water tray 200 by moving the additive by a fixed amount through pumping. For this operation, the pumping unit 400 includes a button 410, a piston 420, an elastic member 430, a fixing ring 442, a cylinder 440, a discharge pipe 450, a discharge valve 455, a suction pipe 460, a suction valve 465 and a support ring 467.

The button 410 is protruded upward from the upper lid 300 through a coupling hole 340, and serves to transfer a pressing force while moved upward/downward by a user. The piston 420 serves to pressurize the inside of the cylinder 440 while moved upward/downward by the button 410. The elastic member 430 serves to provide an upward returning force to the button 410.

That is, when the button 410 is moved downward by the user, the internal pressure of the cylinder 440 is raised by the downward movement of the piston 420. Then, the piston 420 and the button 410 are returned upward by the elastic force of the elastic member 430.

The fixing ring 442 serves to couple the button 410 to the cylinder 440, and fix the button 410 to the top surface of the upper lid 300.

The cylinder 440 serves to put the additive of the additive storage tray 100 into the drinking water tray 200 using a pressure change caused by the upward/downward movement of the piston 420. For this operation, the cylinder 440 is coupled to the suction pipe 460 and the discharge pipe 450.

One end of the suction pipe 460 is connected to the cylinder 440 through the suction valve 465, and the other end of the suction pipe 460 is connected to the additive storage tray 100 through the through-hole 230. The suction valve 465 is provided as a one-way valve to allow only a flow path toward the inside of the cylinder 440.

One end of the discharge pipe 450 is connected to the cylinder 440 through the discharge valve 455, and the other end of the discharge pipe 450 faces the drinking water tray 200. The discharge valve 455 is provided as a one-way valve to allow a flow path toward the outside of the cylinder 440.

Therefore, when the internal pressure of the cylinder 440 is increased, only the discharge valve 455 is opened to discharge the additive of the cylinder 440 to the drinking water tray 200. When the internal pressure of the cylinder 440 is decreased, only the suction valve 465 is opened to suck the additive of the additive storage tray 100 into the cylinder 440.

The support ring 467 may be installed at the bottom of the suction pipe 460.

As illustrated in FIG. 9, the support ring 467 is fastened to the suction pipe 460 at the bottom of the through-hole 230, and serves to guarantee the minimum length of the suction pipe 460 introduced into the additive storage tray 100 and prevent the additive from flowing into the drinking water tray through a gap between the through-hole 230 and the outside of the suction pipe 460.

At this time, the support ring 467 may be formed of an elastic band. As illustrated in FIG. 8, the support ring 467 may be formed in the form of a nut, and fastened through screw coupling.

Hereafter, the operation of the tumbler with an additive storage space according to the embodiment of the present embodiment will be described in detail.

A user puts an additive into the additive storage tray 100 before the tumbler according to the embodiment of the present invention is used, and couples the additive storage tray 100 to the drinking water tray 200 as illustrated in FIG. 9.

Then, when using the tumbler, the user opens the upper lid 300, and fills the drinking water tray 200 with drinking water.

Then, the user presses the button 410 to put the additive of the additive storage tray 100 into the drinking water tray 200.

At this time, the user may put a desired amount of additive depending on how many times the user presses the button 410.

Then, the user makes beverage by shaking the tumbler to mix the drinking water and the additive, and opens the plug 320 to drink the made beverage through the drinking port 310.

Then, after completely drinking the made beverage, the user may refill the drinking water tray 200 with water, and repeatedly make beverage until the additive is completely consumed.

Figure 10:
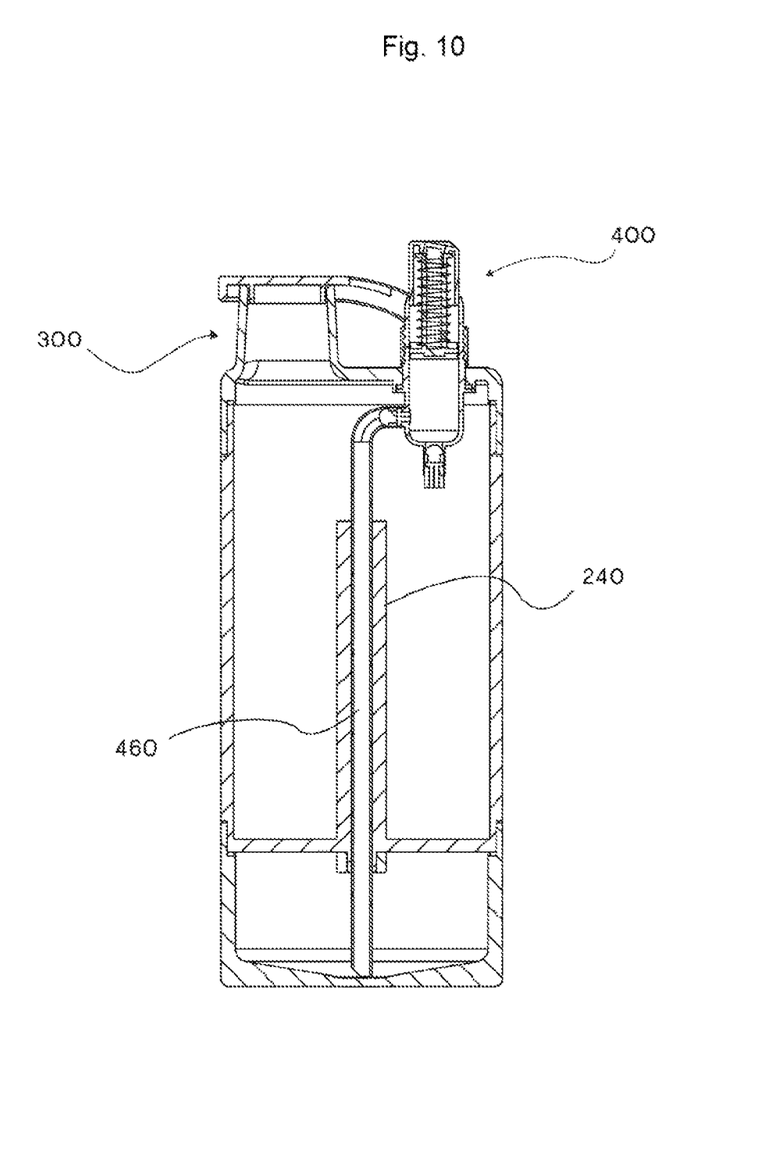
FIG. 10 is a cross-sectional view of a tumbler with an additive storage space according to yet another embodiment of the present invention.

As illustrated in FIG. 10, the tumbler with an additive storage space according to the embodiment of the present invention further includes a guide pipe 240 extended upward from the through-hole 230 in the drinking water tray 200.

The guide pipe 240 is inserted into the suction pipe 460, and functions to divide the internal space of the additive storage tray 100 and the internal space of the drinking water tray 200, such that the internal space of the additive storage tray 100 is separated from the internal space of the drinking water tray 200. Therefore, as long as the tumbler is not tilted at more than a considerable slope, the additive of the additive storage tray 100 can be fundamentally blocked from flowing into the drinking water tray 200.

The scope of the present invention is not limited to the above-described embodiments, but defined as described in the following claims, and it is obvious to those skilled in the art that various modifications and changes can be made without departing the scope of the present invention as described in the claims.

INDUSTRIAL APPLICABILITY

The present invention relates to a tumbler which can add an additive stored in a storage space by a certain amount to drinking water through a pumping unit, such that a user can drink beverage. According to the present invention, the tumbler can store a liquid additive, and add a certain amount of additive therein without taking the stored additive to the outside. Thus, a user can repeatedly make and drink a large amount of beverage while supplying only drinking water into the tumbler.

The invention claimed is:

1. A tumbler with an additive storage space, comprising:
a drinking water tray having an open top and closed bottom to form a storage space for storing drinking water or beverage therein;
an additive storage tray having an open top and closed bottom to form a storage space for storing an additive which is added to water and drunk by a user, wherein the open top is coupled to the bottom of the drinking water tray;
an upper lid covering the open top of the drinking water tray, and including a plug for selectively opening/closing a drinking port through which a user drinks the stored drinking water or beverage; and
a pumping unit fixed to one side of the upper lid, and configured to move the additive stored in the additive storage tray to the drinking water tray by pumping the additive,
wherein the pumping unit comprises:
a button protruded upward from the upper lid through a coupling hole formed at the top of the upper lid;
a piston moved upward/downward by upward/downward movement of the button;
a cylinder having the piston inserted therein such that the inside thereof is pressurized by the upward/downward movement of the piston;
an elastic member providing a returning force to the button and the piston;
a suction pipe connecting the cylinder and the additive storage tray through a through-hole formed at the bottom surface of the drinking water tray, and moving the additive stored in the additive storage tray into the cylinder; and
a discharge pipe extended into the drinking water tray from the cylinder to discharge the additive stored in the cylinder to the drinking water tray.

2. The tumbler of claim 1, wherein the outer surfaces of the upper lid, the drinking water tray and the additive storage tray are formed in a circular or polygonal shape.

3. The tumbler of claim 2, wherein the suction pipe is connected to the cylinder through the suction valve,
wherein the suction valve comprises a one-way valve configured to form only a flow path toward the inside from the outside of the cylinder.

4. The tumbler of claim 3, wherein the discharge pipe is connected to the cylinder through the discharge valve,
wherein the discharge valve comprises a one-way valve configured to form only a flow path toward the outside from the inside of the cylinder.

5. The tumbler of claim 1, wherein the pumping unit further comprises a support ring fixed to the suction pipe at the bottom of the through-hole, guaranteeing the minimum length of the suction pipe introduced into the additive storage tray, and preventing the additive from moving between the through-hole and the outside of the suction pipe.

6. The tumbler of claim 5, wherein the support ring comprises an elastic band.

7. The tumbler of claim 5, wherein the support ring comprises a nut formed of a non-metallic material.

8. A tumbler with an additive storage space, comprising:
a drinking water tray having an open top and closed bottom to form a storage space for storing drinking water or beverage therein;

an additive storage tray having an open top and closed bottom to form a storage space for storing an additive which is added to water and drunk by a user, wherein the open top is coupled to the bottom of the drinking water tray;

an upper lid covering the open top of the drinking water tray, and including a plug for selectively opening/closing a drinking port through which a user drinks the stored drinking water or beverage; and a pumping unit fixed to one side of the upper lid, and configured to move the additive stored in the additive storage tray into the drinking water tray by pumping the additive, wherein the drinking water tray comprises a suction pipe installed through the closed bottom surface thereof, having one side extended into the drinking water tray and connected to the pumping unit and the other side extended to the outside, and disposed in the additive storage tray when coupled to the additive storage tray, wherein the pumping unit comprises:

a button protruded upward from the upper lid through a coupling hole formed at the top of the upper lid;

a piston rod moved upward/downward by upward/downward movement of the button;

a housing of which the inside is pressurized by the upward/downward movement of the piston rod;

an elastic member providing a returning force to the button and the piston rod;

an opening/closing unit installed between the bottom of the housing and the suction pipe, and configured to selectively open/close the suction pipe according to the upward/downward movement of the piston rod; and a discharge pipe extended into the drinking water tray from the top of the button, and discharging the additive moved through the inside of the piston rod to the drinking water tray.

9. The tumbler of claim 8, wherein the outer surfaces of the upper lid, the drinking water tray and the additive storage tray are formed in a circular or polygonal shape.

10. The tumbler of claim 9, wherein the opening/closing unit comprises:

a moving ball valve comprising a round ball formed of a metal, ceramic or synthetic resin; and a coupling member including the moving ball valve installed therein and having one end coupled to the bottom of the housing and the other end coupled to the top of the suction pipe.

11. The tumbler of claim 8, wherein the discharge pipe comprises a one-way valve configured to form only a flow path toward the outside from the inside of the housing.

* * * * *